Jan. 26, 1965

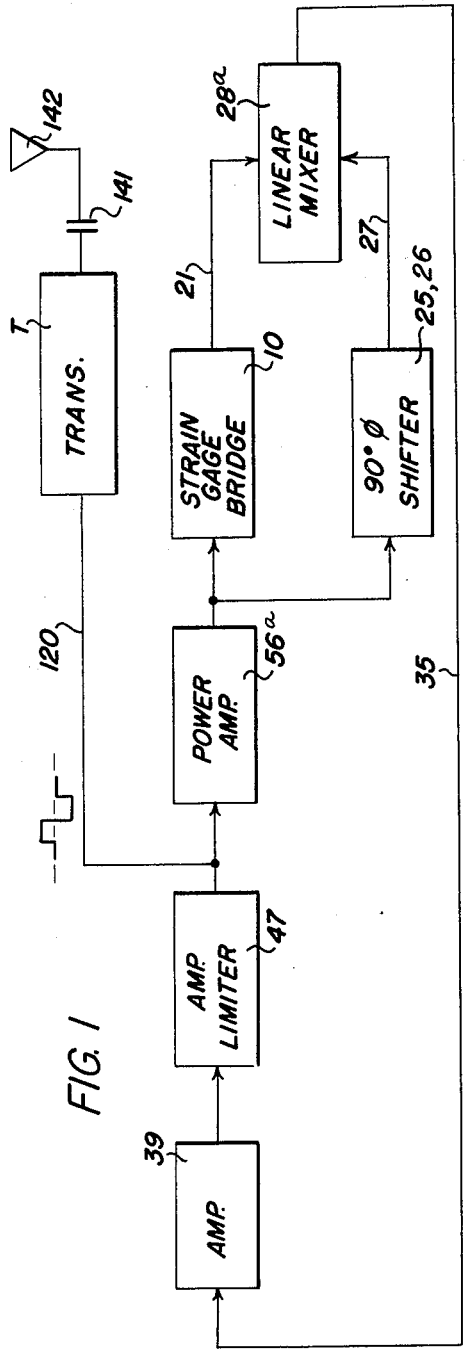
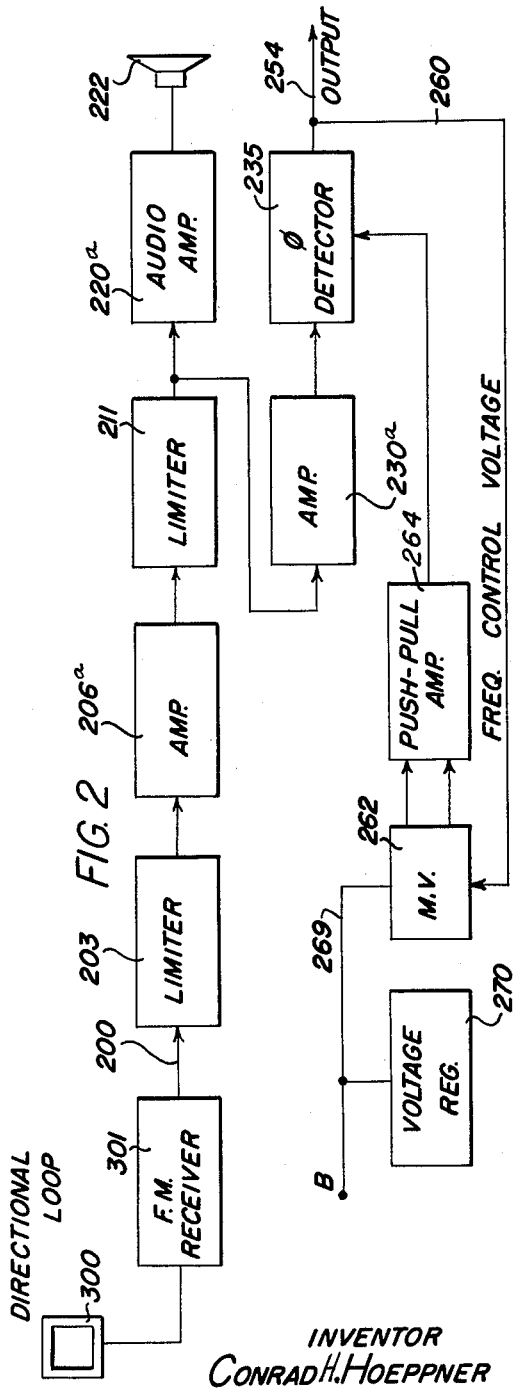

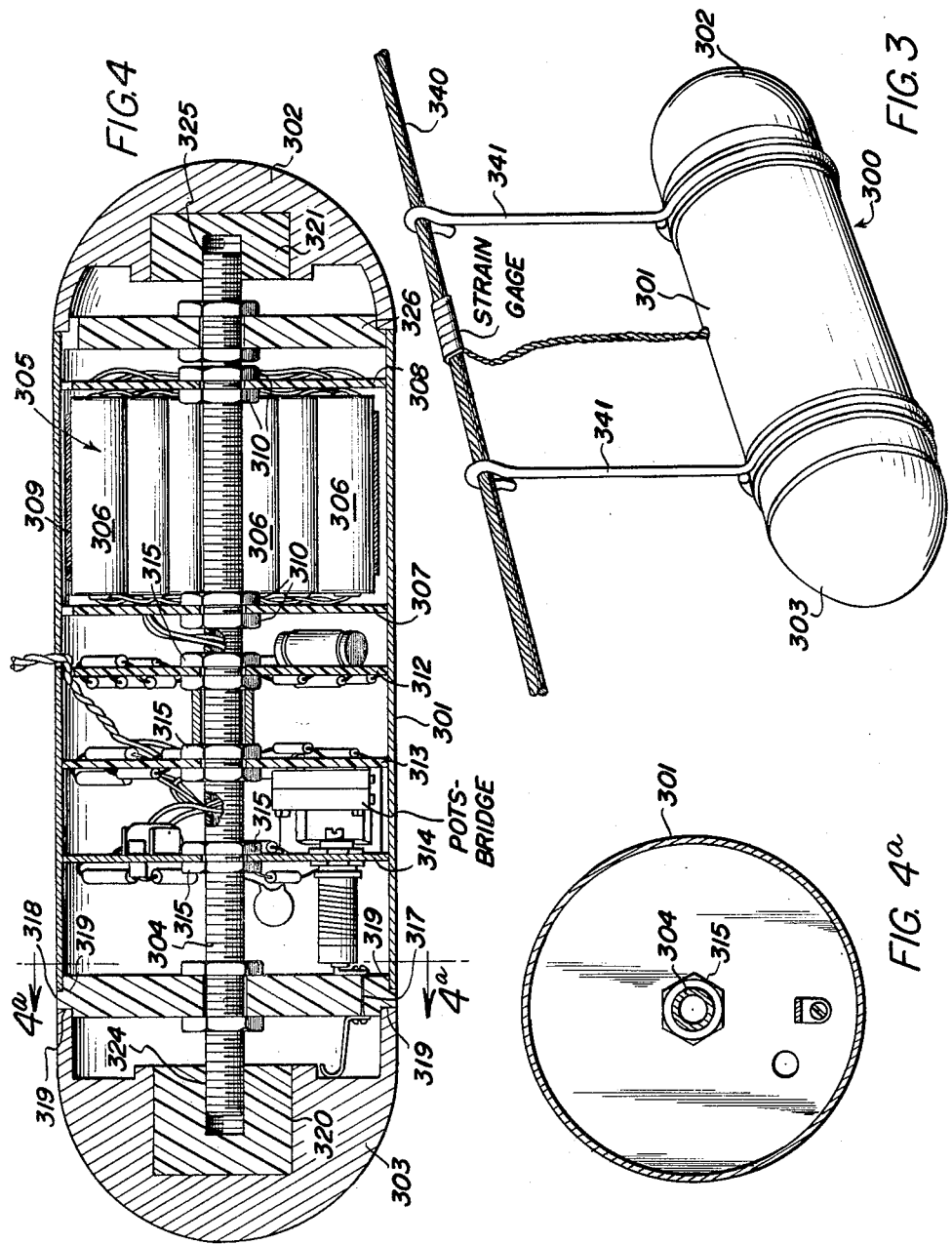

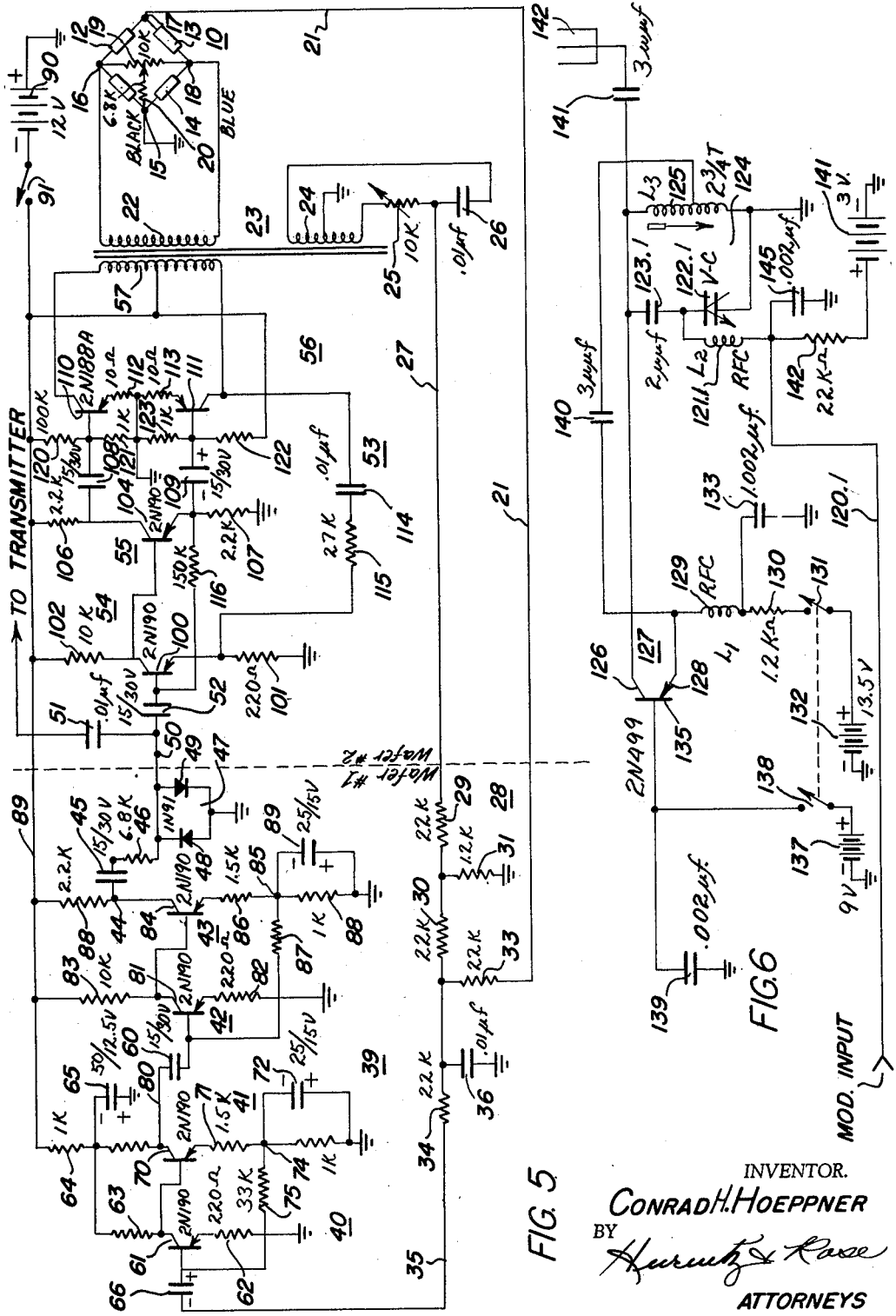

C. H. HOEPPNER 3,167,719

PHASE LOCKED DETECTOR

Filed Nov. 17, 1959

INVENTOR.
CONRAD H. HOEPPNER
BY
Hurwitz & Rose
ATTORNEYS

United States Patent Office 3,167,719
Patented Jan. 26, 1965

3,167,719
PHASE LOCKED DETECTOR
Conrad H. Hoeppner, Indialantic, Fla., assignor to Radiation, Inc., Melbourne, Fla., a corporation of Florida
Filed Nov. 17, 1959, Ser. No. 853,611
9 Claims. (Cl. 329—122)

The present invention relates generally to telemetry systems, and more particularly to systems for radio telemetry of strains present in an activated high power line by means of a frequency modulated transmission from a suitable instrument mounted on the power line.

The problem has long existed of determining the strains which exit in activated electrical power lines, in response to wind gust, relatively steady high winds, changes in ambient conditions, and the like, but the problem has been one of considerable difficulty, which has not been solved heretofore, because of the high A.C. voltage levels occurring on the line, and the high levels of current flow therein, and because of the problem of maintaining insulation between the line and ground and avoiding interference with the operation of the line or increasing the possibilities of improper operation thereof or breakdown thereof by virtue of the presence of measuring equipment secured thereto.

In accordance with the present invention, strains in an activated high power line may be telemetered to a ground station, without any of the disadvantages hereinabove specified, and by means of extremely simple economical equipment. A strain gauge bridge is installed at a selected point of a line, and a radio transmitter, transistorized and battery powered, is hung on the line by means of suitable brackets. The transmitter is mounted in a relatively elongated cigar-shaped case, fabricated of metal, within which a radio frequency transmitter and sub-carrier oscillator elements are mounted. One cap of the container is insulatedly secured to the remainder of the container, and while forming part of the container also acts as the transmitting antenna. Variations in resistance of the strain gauge is caused to vary the frequency of a sub-carrier oscillator, over a range centered in the audio band, and preferably at about 2500 c.p.s. The output of the sub-carrier oscillator is caused to frequency modulate the transmissions from a high frequency radio frequency transmitter of relatively simple charcter, capable of transmitting over short distances.

The various circuit elements of the sub-carrier oscillator and the radio frequency transmitter are mounted on discs fabricated of insulating material, which are in turn secured (on the longitudinal axis) in planes perpendicular to the longitudinal axis of the transmitter case. The antenna cap itself possesses a radiation pattern having a maximum in a plane perpendicular to the axis of the transmitter case, and having a minimum response in that axis. Accordingly, the sub-carrier oscilaltor and the radio frequency transmitter elements are electrostatically shielded by the case from the voltage on the activated line, and moreover, the mode of mounting the components of the sub-carrier oscilaltor and transmitter is such that the voltage gradients due to current variations in the activated line induce no voltage or very little voltage in these components, as well as in the antenna cap. Accordingly, the effect of the proximity of the activated line to the transmitter is minimized, both in respect to electrostatic and electromagnetic interference.

The transmitter itself is frequency modulated in response to the output of the sub-carrier oscillator, which is in turn controlled by frequency by a strain gauge bridge. The sub-carrier oscillator is of the type employing a variable phase shift loop, the loop including the strain gauge and a 90° phase shift circuit in parallel, the outputs of which are combined in a linear mixer and the output of the latter applied to the input of the amplifier components of the lop. The amplifier components include three main elements, i.e., a voltage amplifier, connected in cascade with a voltage limiter, connected in turn in cascade with a driver and class B power amplifier, the latter serving to drive the strain gauge bridge and the 90° phase shift circuit. The signal is taken from the sub-carrier oscillator precisely at the output of the limiter stage, and therefore is of constant amplitude regardless of operating conditions of the amplifier, i.e., gain, input level, and the like.

The transmitter signal is received from the ground by means of a conventional frequency modulation receiver, which abstracts from the transmitted signal the sub-carrier thereon. A novel sub-carrier frequency discriminator is employed which employs a phase-locked loop, voltage step-up transformers and solid stage rectifiers, permitting use of A.C. amplifiers in place of the conventional D.C. amplifiers, and providing stable drift-free output. The output may be derived aurally by means of a small speaker, and may be recorded on a convenient type of signal amplitude-versus-time plotting recorder.

It is accordingly a novel object of the present invention to provide a novel telemetering system capable of telemetering strains on an active power line.

It is a further object of the invention to provide a novel radio transmitter, self-powered and transistorized, which is capable of being hung from an active electrical power line and of transmitting strain information therefrom to the ground station by radio without being deletriously affected by power flow in the power line.

Still another object of the invention is to provide a novel transmitter contained in a metallic case, a portion of which acts as an antenna for the transmitter.

It is a further object of the invention to provide a novel transmitter capable of being hung from an active power line, which includes an electrostatical shield formed in part of an antenna, and which includes further such positional relation with respect to the activated line, and such transmitter component lay-out, as to minimize both electrostatic and electromagnetic interference.

It is still another object of the invention to provide a novel bridge controlled sub-carrier oscillator, employing a phase shift loop, and special amplitude stabilizing features, arranged to provide a variable frequency signal of constant amplitude which varies linearly in frequency in proportion to the strain measured by a strain gauge bridge.

It is a further object of the invention to provide a bridge controlled sub-carrier oscillator having a closed loop including a phase shifting element, and including further a voltage amplifier, an amplitude limiter and a power amplifier all in cascade, to the end that the output of the oscillator shall be amplitude stable, and subject to frequency shifts only.

Still another object of the invention resides in the provision of a frequency controlled sub-carrier oscillator employing a phase shift loop and a frequency determining element, and further employing a limiter as an amplitude stabilization device, the output of the oscillator being derived directly from the limiter, whereby the output of the oscillator is independent of the gain and signal levels present in the amplifier elements of the oscillator.

Still another object of the invention is to provide a novel sub-carrier discriminator employing a phase-locked loop utilizing voltage step-up transformers and solid stage rectifiers, the loop employing alternating current amplifiers rather than the customary direct current amplifiers.

Another object of the invention resides in the provision of a sub-carrier discriminator employing a phase-locked loop in which the local oscillator of the loop is a voltage sensitive multi-vibrator.

A further object of the invention resides in the provision of an FM telemetering system, in which is transmitted frequency modulations generated in response to square wave signals and in which is employed a phase-locked loop type of sub-carrier discriminator wherein the local oscillator is a square wave generator.

It is another object of the invention to provide a novel transistorized radio frequency transmitter of the frequency modulated type, wherein frequency modulation is accomplished by varying the voltage applied to a voltage sensitive capacitor in response to the modulating signal.

The above and still further objects, features and advantages of the present invention will become apparent upon consideration of the following detailed description of one specific embodiment thereof, especially when taken in conjunction with the accompanying drawings, wherein:

FIGURE 1 is a block diagram of a complete transmitter in accordance with the invention;

FIGURE 2 is a block diagram of a complete receiver in accordance with the invention;

FIGURE 3 is a view in perspective of the transmitter installed in a power line, in a system according to the invention;

FIGURE 4 is a view internally of the transmitter of FIGURE 3, indicating the construction and layout employed to minimize electrostatic and electromagnetic interference;

FIGURE 4a is a view in cross section taken on the line 4—4 of FIGURE 4;

FIGURE 5 is a schematic circuit diagram of the sub-carrier oscillator of the present invention;

FIGURE 6 is a schematic diagram of radio frequency modulated transmitter according to the invention; and FIGURE 7 is a schematic circuit diagram of a phase-locked frequency discriminator utilized in the receiver of FIGURE 2.

Referring now more particularly to FIGURE 5 of the accompanying drawings, the reference numeral 10 denotes a strain gauge bridge, of conventional character per se, employing four resistances 11, 12, 13 and 14, arranged in a Wheatstone bridge configuration. One of the resistances 11 to 14, inclusive, is a strain gauge. Bridge 10 includes four junctions 15, 16, 17 and 18, of which junction 15 is grounded and junction 17 provides an output terminal. A relatively high resistance potentiometer 19 is connected between input terminals 16 and 18, and a resistance 20 is connected between the slider of potentiometer 19 and terminal 15, i.e., the grounded terminal. By adjustment of slider on the potentiometer 19, the input circuit of bridge 10 may be balanced with respect to ground. The output of the bridge proceeds to lead 21. Bridge 10, at its terminals 16, 18 is supplied with A.C. voltage from secondary winding 22 of transformer 23. Transformer 23 includes further center-grounded secondary winding 24 which supplies signal to a phase shift network consisting of a variable resistance 25 and fixed condenser 26 in series across secondary winding 24. The junction of the resistance 25 and fixed capacitor 26 supplies signal to lead 27. Resistance 25 is made variable in order to render adjustable the amplitude of the voltage appearing on lead 27, and thereby, as will appear as the description proceeds, permits adjustment of the frequency of the oscillator illustrated in FIGURE 5.

Lead 27 is connected to one side of resistive network 28, comprising series resistances 29, 30 and a shunt resistance 31 which proceeds to ground, and which is connected from ground to the junction of resistances 29 and 30. A further resistance, 33, is connected in series with lead 21 to the output side of resistance 30. Still another resistance, 34, is connected from the output side of the resistance 30 in series with line 35 to the input of the amplifier stages of the oscillator of FIGURE 5. A by-pass condenser 36 is connected between the common junction of resistances 30, 33 and 34 and ground, this condenser having a sufficiently great capacitance to by-pass spurious oscillations to ground and thereby prevent these appearing on lead 35, and being thus applied to the input of the amplifier portion of the oscillator. Network 28, and resistances 33 and 34, operate as a linear mixing circuit and as isolating elements, isolating strain gauge bridge 10 and the phase shifter comprising resistor 25 and capacitor 26 from each other, while combining their outputs on lead 35. Thereby, adjustment of phase shift circuits 25, 26 does not materially affect the output of strain gauge 10 and vice versa, yet the combined outputs are applied to lead 35. In general, the outputs of strain gauge 10 and of phase shift circuit 25, 26 are 90° out of phase, and remain at substantially this value over the entire operating range of the oscillator. As the strain gauge varies its balance, its output as applied at lead 21 varies in amplitude but not in phase. The output of phase shift circuit 25, 26 on the other hand remains constant in both amplitude and phase. Accordingly, the signal as seen at lead 35 is compounded of two 90° separated signals, one of which varies in amplitude. The resultant of the two is accordingly a phase variable signal, but also contains serious total amplitude variations.

The signal available on lead 35 is amplified to relatively high level in a four stage transistor amplifier 39 and including stages 40, 41, 42 and 43, respectively. The output of last stage 43, appearing at terminal 44, is applied via coupling capacitor 45 and through series resistance 46 (6.8K), to amplitude limited 47 comprising parallel back to back diodes 48 and 49. The amplifier 39 amplifies the substantially sinusoidal wave applied at lead 35 to a high level, and this level is sufficiently high that regardless of the extent to which the signal at lead 35 decreases, the output signal at terminal 34 is sufficiently great in amplitude to be limited by limiter 47, at the output of which then appears a sequence of square waves having a frequency determined by the frequency of the oscillator of FIGURE 5.

It will be appreciated that the signal applied to the input of amplifier 39 via lead 35 may have extreme variations of amplitude due not only to the fact that the output of strain gauge 10 is of amplitude variable, but also due to the fact that the gain of the amplifier itself may vary with ambient conditions, age and the like. Nevertheless, the output of amplifier 39 as seen at terminal 49, i.e., following limiter 47, is of fixed amplitude, its sole variational characteristic being frequency.

The amplifier output as seen at terminal 50 is fed by coupling capacitor 51 to a transmitter, illustrated in detail in FIGURE 6 of the accompanying drawings, generally identified by the reference numeral 53 and comprising two cascaded stages 54, 55, which operate as driver and phase inverter, respectively, for class B, push-pull power amplifier stage 56. The latter includes primary winding 57 of transformer 23 at its output and accordingly supplies signal to strain gauge 10 and to phase shift circuit 25, 26 in parallel. A class B amplifier is employed at 56 to conserve current in the absence of signal and to provide high efficiency operation and a large output through strain gauge bridge 10.

The amplifier 39 comprises two sections capacitively coupled together, the first of which comprises stages 40 and 41 and the second of which comprises stages 42 and 43, coupling between the two sections being accomplished by means of coupling capacitor 60. First stage 40 includes PNP transistor 61 having a collector, a base and an emitter. The transistor 61 includes feed-back resistance 62 connected between emitter and ground, a collector load resistance 63, and a voltage dropping resistance 64 in series with the resistance 63, the junction of resistances 63 and 64 being by-passed to ground by means of capacitor 65. The base of transistor 61 is coupled to lead 35 through coupling capacitor 66. The collector of transistor 61 is directly connected with the base of transistor 70 included in the stage 41, and the emitter of the latter is connected to an A.C. ground through negative feed-back resistance 71. The latter is connected to ground through by-pass condenser 72 which is shunted by resistance 73, so that at junction point 74 of resistances 71 and 73, which constitutes an A.C. ground, there appears also a D.C. bias potential. The latter is supplied to the base of transistor 61 via coupling resistance 75. The base of transistor 61 is thus subjected to the steady positive bias potential existing at terminal 74, while the base of transistor 70 is subjected to a positive bias deriving from the collector of transistor 61.

Output voltage from stage 41 is derived from the collector of transistor 70 via lead 80 and is applied through coupling condenser 60 to the base of transistor 81 included in stage 42. The emitter of transistor 81 is connected to ground through negative feed-back resistance 82 which is by-passed. A collector load is supplied for transistor 81 by resistance 83. A direct connection exists between the collector of transistor 81 and the base of transistor 84 included in stage 43. The emitter of transistor 84 is connected to an A.C. ground, at terminal 85, through negative feed-back resistance 86, and point 85 is connected through coupling resistance 87 to the base of transistor 81. Terminal 85 is connected to ground through parallel resistance 88 and by-pass condenser 89, so that a steady D.C. bias potential exists at terminal 85, which is fed to the base of transistor 81 through resistance 87. The collector of transistor 84 is coupled through capacitor 45 and series resistance 46 to limiter 47. D.C. operating potential is supplied to the several stages 40 to 43, inclusive, over lead 89 connected to the negative terminal of 12 volt battery 90, and through manual switch 91.

It is seen that the output terminal 49 provides constant amplitude square waves, of variable frequency.

In operation, the frequency of the sub-carrier oscillator of FIGURE 5 of the accompanying drawings is established in terms of the total phase shift around the loop comprising the oscillator, i.e., when that phase shift equals 360°, and accordingly frequency changes as the phase shift introduced by amplitude variation of the output of the strain gauge bridge 10 occurs. The output of the strain gauge bridge 10 is combined with the output of the phase shifter 25, 26 in 90° phase relation, and the combined or summed signal then represents a phase variable signal, which is, however, also amplitude variable. This signal is applied to high gain voltage amplifier 39, the output of which is clipped or limited to a predetermined and fixed level. This level, then, is the same regardless of the amount of the input signal to the system, and regardless of frequency, and constitutes in fact the output signal derivable from the oscillator. This output is also applied to a further amplifier in cascade, the latter including a voltage amplifier, phase inverter and class B power amplifier in cascade, and the power amplifier drives strain gauge bridge 10. The signal level deriving from phase shift circuit 25, 26 is equal to gain of the amplifier 53 times the level of the signal provided by limiter 47 as it appears at terminal 50. This level is relatively fixed but insofar as it varies, such variation does not affect the output of the oscillator because the latter derives directly from limiter 47. At the same time, the level of signals applied to strain gauge 10 and to phase shifter 25, 26 is independent of the gain of amplifier 39 and of the level of the input signal applied to amplifier 39 via lead 35, i.e., is independent of the output of strain gauge 10. The described operation results in a linear shift of frequency as a function of output of strain gauge amplifier 10 over a wide band of frequencies, these frequencies being for the preferred design of the amplifier, as exemplified in FIGURE 5 of the drawings, centered on the frequency 2500 c.p.s. and varying several hundred c.p.s. above and below that value.

Amplifier stage 54 (FIG. 5) comprises a single transistor 100, the base of which is connected to coupling capacitor 52 and through the latter to output terminal 50 of limiter 47. The emitter of transistor 100 is connected to ground through negative feed-back resistance 101, while the collector is connected through load resistance 102 to D.C. collector bias line 89. The collector of transistor 100 is connected directly to the emitter of transistor 104, which operates as a phase splitter. The collector of transistor 104 is provided with load resistance 106 and the emitter is provided with load resistance 107, these resistances being equal in order to permit development of two equal oppositely phased output voltages. The collector and emitter of transistor 104 are connected separate coupling condensers 108 and 109 to the bases of push-pull transistors 110 and 111, respectively. The emitters of transistors 110 and 111 are connected to ground through small protective current limiting resistances 112 and 113, since transistors 110 and 111 are designed to operate class B, and flow of quiescent emitter current is not desired. The feed-back circuit is provided between the collector of transistor 111 and the emitter of transistor 100, the feed-back circuit being a series circuit comprising condenser 114 and resistance 115, so that a predetermined amount of A.C. signal only will be fed back to transistor 54. Resistances 101 and 115 are selected in magnitude so as to provide a suitable voltage dividing value for the stated purpose. A further feed-back circuit is provided between the emitter of transistor 104 and the base of transistor 100, this feed-back circuit comprising solely resistance 116. A resistive network is provided consisting of two series resistances 120 and 121, connected between lead 89 and ground, and further resistances 122 and 123 connected between line 89 and ground. Resistances 120 and 122 are relatively great and resistances 121 and 123 relatively small, and the bases of transistors 110 and 111 are connected respectively to the junctions of resistance pairs 120, 121 and 122, 123. Thereby, fixed biases are established for the bases of transistors 110 and 111, which bias these suitably for class B operation, taking account of the voltage drops which also occur in resistances 112, 113. Transformer primary 57 is center tapped and the center tap is connected to lead 89, the outer terminals of primary winding 57 being connected respectively to the collectors of transistors 110 and 111.

*RF transmitter*

The output of the sub-carrier oscillator of FIGURE 5, as transmitted through coupling capacitor 51, appears on lead 120.1 of the radio frequency transmitter section of the system, illustrated in FIGURE 6 of the accompanying drawings. This signal is applied through RF choke 121.1 to one side of voltage sensitive capacitor 122.1, the other side of which is grounded. Voltage sensitive capacitor 122.1 in series with a further blocking capacitor of conventional character, 123.1, forms one parallel branch of oscillator tank circuit 124, the other branch being comprised of inductance 125. Tank circuit 124 is connected to the collector 126 of transistor 127, emitter 128 of which is connected through RF choke 129, bias resistance 130, manual switch 131 and bias battery 132 to ground. Taken from the junction of RF choke 129 and resistance 130 is by-pass condenser 133.

Battery 132 has its negative terminal grounded and its positive terminal connected to emitter 128, the polarity being consonant with the transistor type. Resistor 130 and condenser 133 form a self-bias circuit which provides a variable bias in series with the bias provided by battery 132, the variable bias varying as a function of the amplitude of operation of the oscillator of FIGURE 6.

Base 135 of transistor 127 is connected directly to a positive bias source 137 through switch 138, which is ganged with switch 131. RF by-pass condenser 139 is connected between base 135 and ground, i.e., around battery 137. A feed-back connection exists between a point on inductance 125 and emitter 128, the connection being solely capacitive and consisting of condenser 140. Bias battery 141 is connected in series with isolating resistance 142 and with choke 121.1 to one side of voltage sensitive capacitor 122.1, and biases the latter to a suitable operating point, about which its capacity varies in response to the A.C. signal supplied over lead 120.1. The hot side of tank circuit 124 is not only connected directly to collector 126 but also is coupled via D.C. isolating and RF coupling capacitor 141 to transmitting antenna 142.

In operation, the oscillator of FIGURE 6 oscillates at a frequency determined by the constants of tank circuit 124, which includes the capacity of voltage sensitive capacitor 122.1. Accordingly as the amplitude of the A.C. signal applied to the latter varies, the frequency of the oscillator shifts. The oscillator is arranged to provide a deviation corresponding with that common in the broadcast industry, i.e., about ±75 kc. In operation, isolating resistance 142 eliminates modulation signal from the battery 141 and this process is assisted by by-pass condenser 145. RF choke 121.1 isolates the RF signal from lead 120.1 while permitting modulation signal to be applied to voltage sensitive capacitor 122.1. Condenser 123.1 isolates D.C. voltage deriving from battery 132 at collector 123, from both the circuit of battery 141 and lead 120 which supplies modulation signal. RF choke 129 and by-pass condenser 133 prevents flow of RF signal to ground through battery 132, and condenser 139 maintains base 135 at a fixed D.C. voltage, providing a by-pass for RF signal around battery 137.

*Sub-carrier discriminator*

The signal transmitted by the RF frequency modulated oscillator of FIGURE 6 is received by means of a conventional frequency modulation receiver, which abstracts the sub-carrier from the high frequency RF carrier, applying same to cable 200 (FIGURE 7). The function of the system of FIGURE 7 is to provide an output signal corresponding precisely in amplitude to the frequency of the sub-carrier oscillator of FIGURE 5.

The signal applied to cable 200 is fed through coupling condenser 201 and resistance 202 to limiter 203 consisting of parallel back-to-back diodes 204, 205 having one common terminal connected to ground. Across limiter circuit 203 is connected the grid to cathode circuit of triode vacuum tube 206 having in its cathode circuit conventional self-bias circuit 207 and in its anode circuit load resistance 208. The voltage developed at the anode of triode 206 is coupled via coupling condenser 209 and current limiting resistance 210 to second limiter 211 consisting of parallel back-to-back diodes 212 and 213. Relatively high resistance 214 is connected across back-to-back diodes 212, 213 and with resistance 210 form a voltage divider for applying across limiter 211 a predetermined proportion of the voltage available at the anode of triode 206.

Triode 215 is connected with its grid to cathode circuit across limiter 211, triode 215 including in its cathode circuit RC self-bias circuit 216 and in its anode circuit load resistance 217. The signal across the latter is coupled through coupling condenser 218 and grid leak resistance 219 to the grid of triode 220. The latter includes negative feed-back resistance 221 in its cathode circuit, and coil 222 of a small loudspeaker in its anode circuit. Grid leak resistance 219 is shunted by filter condenser 223 for spurious high frequency responses which may be generated by the limiting process, and very high resistance 225 is connected in series with the grid of triode 220 from the ungrounded end of grid leak resistance 219, to reduce possible current flow in the grid circuit of triode 220. Accordingly, the tone provided by the sub-carrier oscillator of FIGURE 5 of the accompanying drawings may be heard on the loudspeaker of the discriminator circuit of FIGURE 7 of the accompanying drawings.

The grid of triode 220 is directly connected to the grid of triode 230, having in its cathode circuit a self-bias RC network 231 and having in its anode circuit load resistance 232. Connected across load resistance 232 is primary winding 233 of transformer 234, which supplies signal to phase sensitive bridge 235, transformer 234 being a voltage step-up transformer and having secondary winding 236 center tapped at point 237 and having its extreme terminals each connected to oppositely poled diodes 238 and 239. Connected between center tap 237 and ground is condenser 240. Further, filter condensers 241 and 242 are connected between the end terminals of transformer secondary 236 and center tap 237 and still another pair of integrating condensers 243, 244 is connected between the load side of diodes 238 and 239 and ground.

Connected across condensers 243 and 244 is an array of three resistances 250, 251 and 252 in series, the central resistance 251 being a potentiometer and including slider 253, to which is connected output lead or cable 254. Resistances 250 and 252 are equal, and the setting of slider 253 along resistance 251 can accordingly be adjusted to have at a precise balance point a zero signal, for one phase condition, and a signal having polarity and amplitude representative of phase difference of input signals to bridge 235.

From slider 253 is taken lead 260 between which and ground is established a relatively high resistance 261. A normally free running multi-vibrator 262 is provided, including two triodes 263, 264, the cathodes of triodes 263, 264 being connected together and being jointly connected to ground through resistance 265. The anode of triode 263 is coupled to the grid of triode 264 through coupling condenser 267, while the anode of triode 264 is coupled with grid of triode 263 to condenser 268. The grids are connected back to ground by equal resistances 268a and 268b, respectively. B+ lead 269 is provided, having a voltage which is highly regulated by regulator tube 270 that is connected in series with power resistance 271, in series with an unregulated source connected to terminal 272. Regulator tube 270 is a conventional two-electrode gas tube and is by-passed by filter condenser 273 to assure that the voltage on lead 269 is not only of a precisely predetermined value, but is not subject to random fluctuations in value. B+ lead 269 is connected to the anodes of triodes 263 and 264 through load resistances 275 and 276.

Due to the RC coupling between the anode of each of triodes 263, 264 and the grid of the other triode, triodes 263 and 264 and their associated circuitry operate as a multi-vibrator oscillator. The frequency of the oscillator has a nominal value of 2500 c.p.s. in the presently described embodiment of the invention, corresponding precisely with the mean or nominal frequency of the incoming signal at lead 200. This frequency is, however, subject to control and variation in response to signal applied over lead 260, since multivibrator 262 is voltage sensitive to a control voltage on leads 260, applied to the grids of triodes 263, 264. The frequency of multi-vibrator 262 is thus a function of the voltage available at cable 254.

The voltages at the anodes of triodes 263, 264 are respectively fed via coupling condensers 280, 281 and grid leak resistances 282, 283 to the grids triodes 285 and 286, each of the latter having in series therewith current limiting resistances 287 and 288 to assure that no flow of grid current will take place. Cathodes of triodes 285, 286 are connected together and to ground through small common un-bypassed resistance 290 and their anodes are connected together across resistance 291 and across transformer primary winding 292, the latter being center tapped at 293 and the center tap being connected back via lead 294 to B+ lead 269.

Accordingly, triodes 285, 286 operate as a push-pull amplifier for feeding primary winding 292. The latter in turn supplies signal to secondary winding 295 which is connected across condenser 240. The bridge 235 accordingly operates in conventional fashion as a phase detector bridge or phase meter, providing an output at cable 254 which is a function of the difference in phase of the signals supplied thereto from transformer primaries 233 and 292. The transformer comprising windings 292 and 295 is a step-down transformer, since relatively high amplitude signal may be provided by triodes 285, 286. On the other hand, transformer 234 is a voltage step-up transformer, and the relative ratios of step-down and step-up voltage are selected to provide approximate equality of signal input to the bridge.

Phase detector 235 is conventional in character per se, and comprises in essence two diode peak reading volt meters which have been differentially connected. This type of phase meter is adequately described in the textbook entitled Electronic Engineering, by Samuel Sealy, published by McGraw-Hill Book Company, Inc., in 1956, at page 424.

In operation then, the input signal is limited in two cascaded stages 203 and 211 to a fixed value, the so clipped or limited signal being supplied to one input of phase meter 235, while to the other input is applied the output of multi-vibrator 262. The signal, as transmitted, is square wave frequency modulated, since it derives from limiter 47 in the sub-carrier oscillator. Accordingly, the phases of the two signals deriving respectively from the sub-carrier oscillator and from multi-vibrator 262 are of generally similar wave shape, and their phases may accordingly be accurately determined by phase meter 235 insofar as there is a difference in phase. The latter is a consequence of a frequency difference, and this difference gives rise to a control voltage on lead 260 which in turn is reflected at multi-vibrator 262 as a change in output frequency of the latter. The change is always in such sense and of such extent as to tend to bring about frequency and phase coincidence. As the output frequency departs from its nominal value, accordingly, a voltage is developed at slider 253 which represents the departure of that frequency from the nominal frequency of multi-vibrator 262, since it is the voltage which is required to bring the frequency of multi-vibrator 262 back into coincidence with the input frequency. Accordingly, the system of FIGURE 7 operates as a frequency discriminator. The frequency discriminator, however, operates on A.C. throughout, and does not require the use of D.C. amplifiers, which are complex and undesirable for that reason.

*Description of overall operation*

The over-all operation of the system of the present invention is described by reference to FIGURES 1 and 2 of the accompanying drawings.

In the system of FIGURE 1, frequency modulation transmitter T is provided, the output of which is coupled by means of condenser 141 to an antenna 142. Transmitter T provides an RF frequency in the conventional FM broadcast band, and the deviations of the carrier transmitted thereby are appropriate for reception in any conventional FM receiver. Modulating signal is applied to the transmitter T over lead 120, and consists of a sub-carrier oscillation having a nominal frequency of about 2500 c.p.s., the frequency varying as a function of telemetered signal by deviations of approximately plus and minus 300 c.p.s. The signal applied to lead 120 is derived directly from amplitude limiter 47 and consequently constitutes a square wave voltage of fixed amplitude. Amplitude limiter 47 is included in a loop constituting a phase shift oscillator. Such oscillators are known in a broad sense, and their operation depends on the inclusion in the loop of a total phase shift of 360° or some multiple thereof. So long as this phase shift condition around the entire loop exists, and so long as signal amplitudes in the loop are adequate, oscillations will occur. Assuming then, that the signal amplitudes are adequate to sustain oscillation, any change of any phase determining element of the loop will result in a frequency shift of the oscillator, since the frequency will adjust itself so as to re-establish the total phase shift around the loop equal to 360° or a multiple thereof. In the loop, amplitude limiter 47 supplies signal to a power amplifier 56a, which includes not only a power output stage operated class B, but a suitable voltage amplifier and phase inverter for driving the latter.

The output of power amplifier 56a is applied in parallel to resistive strain gauge bridge 10 and to 90° phase shift circuit 25, 26. The outputs of bridge 10 and phase shifter circuit 25, 26 are applied over leads 21 and 27 to linear mixer circuit 28a, which at its output provides a resultant signal having a phase determined by the amplitude of the output provided by strain gauge bridge 10. This resultant signal is applied over lead 35 to voltage amplifier 39 which in turn feeds amplitude limiter 47. As necessary to establish a desired mean frequency for the oscillator, a further phase shift circuit may be incorporated at any convenient point in the loop, such that upon balance of strain gauge bridge 10, a desired mean frequency will be generated. Thereupon, as strain gauge bridge 10 provides greater and smaller signal output, the combination of that output with a fixed amplitude output at 90° relation thereto provided by phase shifter 25, 26 provides a phase varying output on lead 35. Not only is this output phase-varying, but its amplitude also varies, as a function of strain gauge output. It will be appreciated that amplifier 39 will, accordingly, have a variable amplitude applied thereto. Moreover, amplifier 39 may not have constant gain as ambient conditions change and as amplifying elements age. However, regardless of the amplitude of input to amplifier 39 or the gain of the latter, the amplitude limiter 47 provides a constant amplitude output signal to transmitter T. The presence of amplitude limiter 47, and the fact that output signal is derived directly therefrom, also assures that variations in gain of power amplifier 56a, which are reflected in variations of output amplitude of signal at lead 35 also will not effect the output amplitude or the output frequency. It will be appreciated that any change in output of power amplifier 56a is reflected as an identical change in the outputs of both strain gauge bridge 10 and 90° phase shifter 25, 26, and accordingly does not effect the phase of the output signal on lead 35.

I have accordingly provided a novel sub-carrier oscillator and transmitter, in which output frequency is a function of strain gauge measurements only, and is independent of frequency, of ambient conditions, and of amplification and gain in the loop constituting the oscillator.

The signals transmitted by FM transmitter T are received on loop directional antenna 300, and applied to FM receiver 301, which detects the sub-carrier present on the FM transmissions and applies same to lead 200. At lead 200, then, appears the signal generated by the sub-carrier oscillator of FIGURE 1. This signal is applied, via audio amplifier 220a, to speaker 222 so that it may be aurally monitored. This output is also applied to amplifier 230a which applies the signal to phase detector 235. The other input to phase detector 235 is provided by a voltage sensitive multi-vibrator 262 through a push-pull amplifier 264. Multi-vibrator 262 is controlled in respect to frequency by the amplitude deriving from phase detector 235 via a control lead 260, and, accordingly, the voltage on lead 260 represents the frequency of the signal of the transmitter sub-carrier oscillator. The sub-carrier discriminator, employing as it does a phase locked loop, has been designed to utilize only A.C. amplifiers in place of the customary D.C. amplifiers, with resulting reduction of complexity. The output signals provided by phase locked detectors are well known to be exceedingly stable and drift-free, so that the output signal which may be taken from lead 254 very accurately represents in amplitude the frequency of the sub-carrier oscillations.

*Antenna and transmitter structure*

As seen in FIGURES 3, 4, and 4a, the transmitter and antenna structure of the present invention consists of metallic case 300 having three parts, i.e., hollow thin walled metallic tube 301, first metallic cap 302 and second metallic cap 303. Stud or threaded tube 304 is provided, which may be assumed to define the longitudinal axis of the transmitter structure. Battery assembly 305 surrounds the threaded tube 304, number of pen-lite batteries 306 being distributed with their axes parallel to the axis of tube 304, and occupying the space between two insulating discs 307, 308. The pen-lite batteries are wrapped in place by means of band 309. The positions of discs 307, 308 with respect to the threaded tube 304 are fixed by means of nuts 310, which clamp the discs in place and thus clamp the pen-lite cells between the discs 307, 308.

The other sections of the transmitter, i.e., the subcarrier oscillator and the transmitter are mounted on discs 312, 313, 314. The latter are fixed in position by means of nuts 315, which threadedly engage threaded tube 304, and the discs extend in planes at right angles to the latter. Closure disc 317 is provided, which disc has central rim 318 equal in diameter to the outer diameter of metallic tube 301 and to the outer diameters of the cap 303, which are substantially equal in outer diameter to the outer diameter of tube 301. Disc 317 is provided with annular shoulders of slightly reduced diameter on either side of central rim 318. Caps 302, 303 are each provided with a central axial insert, 320 and 321, made of insulating material and internally bored and threaded at 324 and 325. Shell 301 fits over several discs, 317, 314, 313, 312, 307, 308 and 326, providing an electrostatic shield therefor. Two end caps 302, 303, by virtue of their internally threaded insulating inserts 320 and 321 are threadedly engaged on the ends of the threaded tube 304. However, one end of tube 301 bears against the edge of cap 302 and is in contact therewith while the other end bears against one shoulder 319 in disc 317, the remaining cap 303 bearing against the opposite shoulder 319 of disc 317. Thereby, caps 302 and 303 when threadedly engaged, clamp tube 301 therebetween, but cap 303 is insulated from tube 301 by virtue of disc 317, which acts as a spacer, and is insulated from threaded tube 304 by virtue of insulated threaded insert 320. Accordingly, cap 303 is electrically isolated from remainder of case 300 and the transmitter, and may be utilized as an antenna, the remainder of case 300 then constituting a ground plane.

The antenna is essentially a single rod operating against a ground plane and consequently has a directional characteristic which is a maximum in a plane perpendicular to the axis of the antenna, and which is zero in the direction of the axis. The entire transmitter comprised in case 300 is attached to a power line 340 by any suitable type of brackets 341. The power line 340, by virtue of the current flowing therein, possesses a magnetic field solenoidal with respect to the power line as an axis, and this solenoidal field gives rise to an electrostatic field having an electric component extending parallel to the line. This field has accordingly, no effect on the antenna. Moreover, the case itself provides excellent electrostatic and electromagnetic shielding against the power line voltages and the fact that the components are all mounted concentrically with respect to the axis of the transmitter implies that substantially no voltage will be induced in these components, even by virtue of leakage through the case, since the electric inducing field is perpendicular to the plane of the discs on which the components are mounted, and in general extends perpendicular to the lengths of the components, the latter generally lying flat against the discs.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. A phase locked detector, comprising an amplitude limiter, an alternating current amplifier connected in cascade with said amplitude limiter, said amplifier having an output circuit including a transformer primary winding, a voltage sensitive multi-vibrator deriving a variable frequency output, a phase sensitive bridge having two input circuits and an output terminal, each of said input circuits including a transformer secondary winding, a further transformer primary winding, means coupling the output of said voltage sensitive multi-vibrator in driving relation to said further transformer primary winding, means coupling each of said primary windings to one of said secondary windings, and a direct current circuit connecting said output terminal to said voltage sensitive multi-vibrator in frequency control relation thereto the conduction path of said bridge between the output of said multivibrator and said last named circuit being substantially zero for the variable frequency output of said multivibrator.

2. The combination according to claim 1 wherein said multi-vibrator includes two vacuum tubes, a first of said vacuum tubes having a first anode, grid and cathode, a second of said vacuum tubes having a second anode, grid and cathode, a first condenser connected between said first anode and said second grid, a second condenser connected between said second anode and said first grid, a cathode resistance connected jointly directly from said cathodes to ground, a separate resistance connected between each of said anodes and a B+ voltage supply, a further resistance connected between said output terminal and ground, and separate resistances connected between an ungrounded point of said further resistance and said first and second grids, respectively.

3. The combination according to claim 1 wherein said means for coupling includes a push-pull A.C. amplifier having first and second anodes, means for A.C. coupling said first and second anodes, respectively, in push-pull relation inductively to said second transformer winding.

4. The combination according to claim 3 wherein said push-pull A.C. amplifier includes a push-pull primary transformer winding coupled inductively to said second transformer winding.

5. A phase locked discriminator comprising an A.C. phase detector, said phase detector including a first center-tapped transformer winding, a first rectifier, a second rectifier and resistance all connected in series with each other and with said first center-tapped transformer winding in a closed loop, said rectifiers being identically poled in said loop, a second transformer winding connected to said phase detector to apply signal in parallel to said rectifiers via said center tap and a ground point, a source of first frequency modulated signal coupled to said first center-tapped transformer winding, a control voltage sensitive multi-vibrator deriving an alternating current output having a nominal frequency equal to the average frequency of said frequency modulated signal and subject to frequency modulation in response to a control voltage applied to a control point of said multi-vibrator, means for coupling the alternating current output of said multi-vibrator as the only signal applied to said second transformer, an output terminal for said phase detector comprising a tap positioned between the end points of said resistance, and a D.C. connection between said output terminal and said control point of said multi-vibrator for applying said control voltage to said multi-vibrator.

6. A phase-locked frequency discriminator for a frequency modulated signal, comprising a source of said signal, a signal amplitude limiter A.C. coupled in cascade to said source of said signal, an A.C. amplifier coupled via an A.C. coupling circuit in cascade with said limiter, said A.C. amplifier including an output transformer primary winding, a voltage step-up transformer comprising said primary winding, said voltage-step-up transformer including a balanced secondary winding inductively coupled to said primary winding, a multi-vibrator having a nominal frequency equal to the mean frequency of said frequency modulated signal arranged to be variable in respect to frequency in response to a control voltage, a push-pull A.C. amplifier A.C. coupled to said multi-vibrator, said push-pull A.C. amplifier including a balanced primary transformer winding as an output load, a voltage step-down transformer including said balanced primary transformer winding and a single-ended secondary winding inductively coupled to the last named winding, a phase detector bridge connected to said secondary windings and arranged to provide an output signal representative of phase deviation between signals provided by said secondary windings to said phase detector bridge, and separate means applying said output signal to said multi-vibrator as said control voltage in such sense as to tend to maintain equality of phase and frequency between said frequency modulated signal and the output of said multi-vibrator.

7. A phase-locked discriminator comprising a phase detector bridge, a source of signals only A.C. coupled to said bridge, a source of local oscillations only A.C. coupled to said bridge, said source of local oscillations being frequency variable in response to a control voltage and having nominally the same frequency as the frequency of said signals, means for deriving phase representative voltage from said phase detector bridge, and means for applying said phase representative voltage in such sense to said source of oscillations as to tend to maintain the frequency of said source of local oscillations equal to the frequency of said signals, the conduction path of said bridge between said source of local oscillations and said last named means being substantially zero for the variable frequency oscillations.

8. The combination according to claim 7, wherein said source of local oscillations is a square wave generating multi-vibrator, and wherein said signals are square wave signals.

9. The discriminator of claim 7 wherein said means for applying is a D.C. coupling means.

References Cited in the file of this patent
UNITED STATES PATENTS

| | | |
|---|---|---|
| 2,332,540 | Travis | Oct. 26, 1943 |
| 2,462,759 | McCoy | Feb. 22, 1949 |
| 2,555,867 | Bennett | June 5, 1951 |
| 2,684,439 | Wilmotte | July 20, 1954 |
| 2,695,952 | Barton | Nov. 30, 1954 |
| 2,717,309 | Campbell | Sept. 6, 1955 |
| 2,764,681 | Howell | Sept. 25, 1956 |
| 2,838,673 | Fernsler et al. | June 10, 1958 |
| 2,881,319 | Sills | Apr. 7, 1959 |
| 2,911,528 | McRae | Nov. 3, 1959 |